March 17, 1953 P. J. CHENERY 2,632,142
DAMPING SYSTEM FOR DIRIGIBLE CRAFT
Filed June 14, 1950
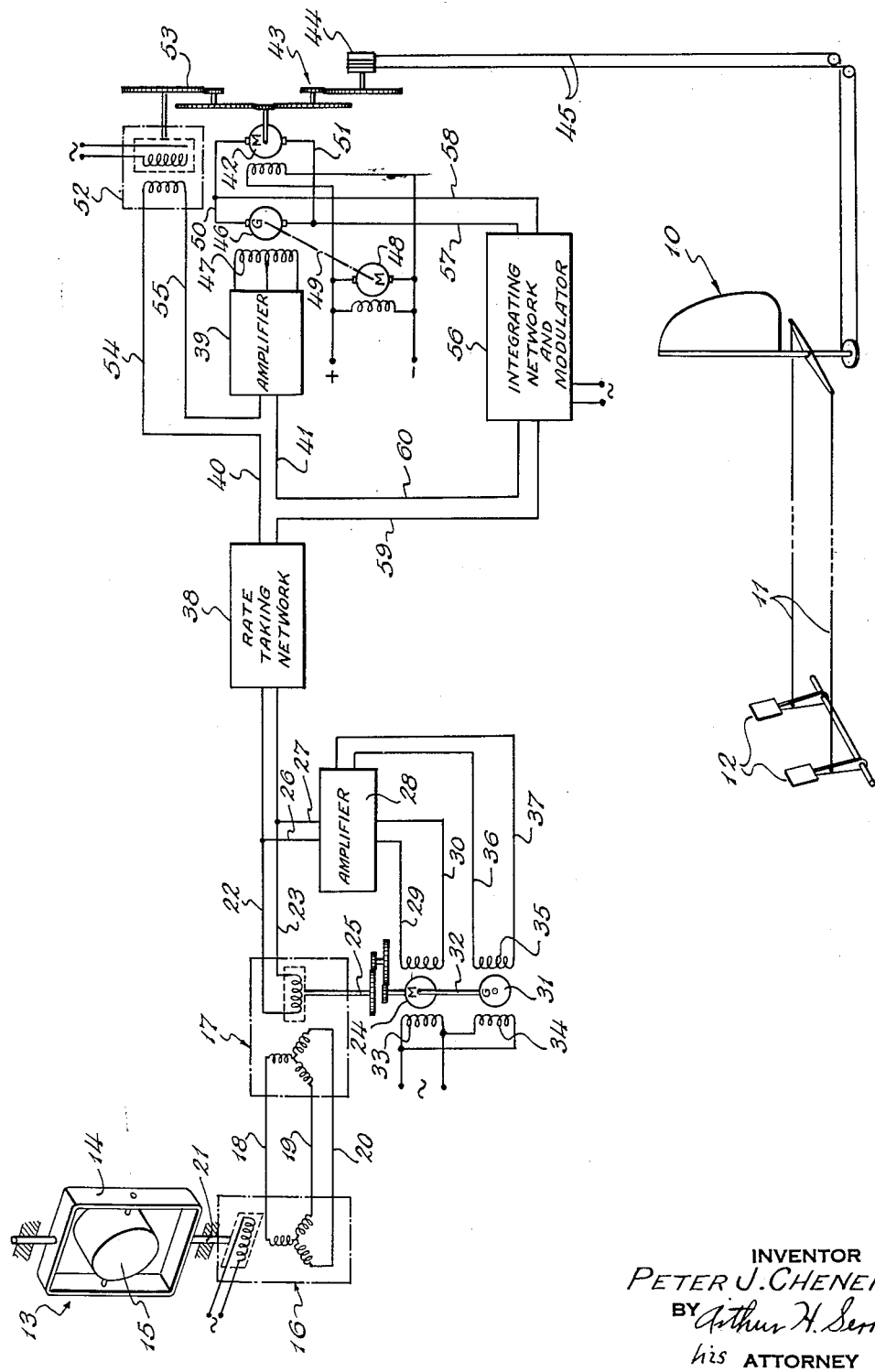
INVENTOR
PETER J. CHENERY
BY Arthur H. Serrell
his ATTORNEY Patented Mar. 17, 1953

2,632,142

UNITED STATES PATENT OFFICE 2,632,142

DAMPING SYSTEM FOR DIRIGIBLE CRAFT

Peter J. Chenery, Pelham, N. Y., assignor to The Sperry Corporation, a corporation of Delaware Application June 14, 1950, Serial No. 168,062

11 Claims. (Cl. 318—489)

This invention relates to an automatic system for improving the damping of a manually controlled dirigible craft such as an aircraft, about the respective axes thereof. The present illustrative embodiment of the invention depicts a yaw axis damper for aircraft. It will be understood that the improved system is equally applicable to a dirigible craft about its pitch and roll axes.

Systems of this character are particularly desirable in aircraft which have low aerodynamic damping in order to obtain improved performance from the aircraft when it is manually controlled. Without automatic damping under certain conditions of speed and altitude, a craft with low aerodynamic damping may exhibit lightly damped or even continuous oscillations in yaw, pitch and roll which require continued control movements by the human pilot through his manually operable controls to maintain the craft on a particular heading in a level condition.

A particular object of the invention is to obviate this condition in low aerodynamically damped aircraft.

A further object of the invention is to provide a system of this character that distinguishes between short period disturbances and steady state turn conditions such as occur with the maneuvering of an aircraft about its yaw axis.

In accordance with the invention, the improved damping system for manually controlled dirigible craft includes, the combination of, a positional reference device for the craft, a differential, a follow-up motor connected to the output of the differential, means for providing a measure of the rate of change of the output of the differential, and motive means responsive to the output of the rate measuring means operable to control the craft about its axis. The differential inputs of the system are provided by connections to the follow-up motor and to the positional reference device.

One of the features of the invention resides in the provision of a means for providing a signal proportional to the time integral of the output of the motive means operatively connected to the control surface or rudder of the craft.

Other objects, features and structural details of the invention will be apparent from the following description when read in relation to the accompanying drawing which shows a single diagrammatic view and circuit diagram of the improved damper system.

With reference to the drawing, a damping sytem embodying the present inventive concepts is shown adapted for use in a dirigible craft such as an aircraft employing a rudder 10 or other movable surface for controlling its movements about the yaw or vertical axis thereof. As shown the steering control or rudder, in this instance, is manually actuated by way of suitable connecting cables 11 and a pedal mechanism 12 to provide a manually operable means connected to the surface so that the pilot is able to manually control his craft about its yaw axis as desired. My improved system is adapted to be employed in any type of manual control for aircraft with or without booster aid and the controls herein shown for manual operation are illustrative only. In this connection, the manually operable control means for the craft may be other than a movable surface such as rudder 10. Also, the control axis may be horizontal instead of vertical, in which instance, the rudder could be either the elevators or ailerons of the craft or both.

As shown in the drawing, the improved damping system includes a device for detecting departure of the craft from a reference position about its control axis. As the selected control axis in this instance is the vertical or yaw axis of the craft, this device may take the form of a directional gyro 13 having a vertical ring 14 supported in the craft with freedom about an axis corresponding with or parallel to the vertical or yaw axis of the craft. The directional gyro detect departure of the craft from a reference position about its vertical axis measured by relative movement between the craft and the vertical ring 14 of the gyro. In adapting the invention to control of the craft about its horizontal axes, the reference device provided could be a gyro vertical with its major axis parallel or corresponding with the fore and aft axis of the craft and its minor axis parallel to or corresponding with the pitch axis of the craft. In the system shown in the drawing, the rotor case of the directional gyro is indicated at 15. Suitable means not herein shown is provided for maintaining the rotor case 15 of the directional gyro in a level condition. If desired, the directional gyro may also be slaved to the earth's magnetic field in a manner well known in the art.

The improved damping system also includes a differential or comparator having a pair of inputs and an output. As shown, the differential is electrical in form being constructed of a pair of synchros or selsyn devices 16 and 17 with stator and rotor parts, one part of each having a polyphase winding, which windings are interconnected by way of leads 18, 19 and 20. Shaft 21 connects the rotor of selsyn device 16 and the ring 14 of the directional gyro to provide a means connecting the reference device and one of the inputs to the differential of the system. The single winding of selsyn device 16 is energized by way of a suitable source of alternating current electrical energy as indicated.

The output of the differential is provided by the signal in the leads 22, 23 from the rotor of synchro or selsyn device 17. The other input to the differential is provided by the rotor device 17 which is connected to follow-up motor 24 by way of shaft 25. Motor 24, having an inherent time delay, is responsive to the output of the differential by way of the leads 26, 27, follow-up amplifier 28 and leads 29, 30. As shown, motor 24 also drives a generator 31 of the eddy current type producing an output in phase with the supply and a voltage proportional to the speed at which it is driven. The generator is connected to the motor by way of shaft 32. The motor 24 and generator 31 are excited from a common source of alternating current electrical energy by way of windings 33 and 34, respectively. As shown, the generator 31 feeds back a signal to the amplifier 28 from generator winding 35 by way of leads 36, 37 to make the rotational speed of the motor 24 proportional to the amplitude of the operating signal at leads 22, 23. The follow up amplifier 28 and motor-generator set provided cooperate to move the rotor of selsyn device 17 to restore the output of the differential to zero. In steady state turn conditions such as caused by the pilot's displacement of the manual controls for the rudder, the follow-up motor 24 operates to continuously zero the output of the differential so that steady state turn rates are prevented from appearing as changing inputs to the motive means of the system connected to operate the control surface or rudder 10.

Short period yawing disturbances of the craft, however, are detected by the reference device to control the differential and provide an output that, due to lag in the operation of the motor 24, is permitted to operate such yaw system to properly damp the movements of the craft automatically.

In accordance with the invention, means are provided to measure the rate of change of the output of the differential. As shown, such means is diagrammatically illustrated as a suitable rate taking network 38 that may be of the character shown in Patent No. 2,446,567 issued August 10, 1948 to G. E. White et al. The input to network 38 is supplied by way of leads 22, 23.

The system also includes motive means responsive to the output of the rate of change measuring means operable to control the craft about its axis. As herein shown, such motive means may include an amplifier 39 connected to the rate measuring means 38 by way of leads 40, 41, a Ward Leonard type motor-generator set, and a motor 42 which is connected to rudder 10 by way of gearing 43, drum 44 and cable 45. As shown, the armature circuit of motor 42 is energized by the output of a generator 46 whose field windings 47 are energized by the output of amplifier 39. Generator 46 is driven at a constant speed by the constant speed motor 48 connected thereto by way of shaft 49. Leads 50, 51 connect the generator 46 and motor 42. In the described system, short period yaw disturbances of the craft are detected by the combined reference device and follow-up motor arrangement, which may be termed a differential, the output of which constitutes an error signal which is fed to the rate taking network 38. The output of the network 38 or signal corresponding to the rate of change of the error signal is then fed to the motive means by way of amplifier 39 to effect operation of the rudder 10 to damp the craft disturbance about its yaw axis.

My improved system also includes a control term for the actuating means for the motive means which is a measure of the displacement of the rudder 10 or other control surface from a null position. The displacement repeatback herein shown includes a selsyn device 52 whose energized rotor is connected to motor 42 by way of gearing 53. The stator of device 52 is connected to the input leads 40, 41 to amplifier 39 by way of leads 54, 55. Selsyn device 52 provides a reversible phase output dependent in the direction of the departure of the rudder from a null position. The amplitude of the signal of this repeatback arrangement depends on the magnitude of the departure of the rudder from its null position. The repeatback signal also normally opposes the input controlling signal to amplifier 39 from the rate taking network 38. In the absence of a controlling input signal, the repeatback signal operates the motor 42 to restore the rudder 10 or other control surface to a null position.

In accordance with the invention, the system also includes a means for providing a signal proportional to the time integral of the input to the motive means 42. As herein shown diagrammatically, such means may be provided by a suitable integrating network and modulator of known type designated at 56 formed, for example, by a resistance-capacitance network connected to the output of generator 46 by way of leads 57, 58 and a suitable A. C. energized modulator whose output is connected to the input to amplifier 39 by way of leads 59, 60. The signal from network and modulator 56 is fed to the amplifier 39 for the motive means in opposition to the input thereto from the displacement measuring means of the system. In manual operation of the craft by the pilot through pedals 12, the displacement repeatback produces an opposing effort through the motive means which acts as an electrical spring that opposes the efforts of the pilot. With a persistent input to the motive means or motor 42 the network 56 and modulator are effective to produce an opposing signal for the displacement repeatback signal which reduces the input to amplifier 39 and permits the pilot to overpower the motive means to manually control the craft, as desired.

As shown, the signal from network and modulator 56 is fed to amplifier 39 by way of leads 59, 60 and leads 40, 41. The combined manually operable means, displacement repeatback, motive means, integrating network and modulator form a means for providing a signal upon persistent unidirectional operation of the manually operable means. This signal is employed to override the normal effort of the repeatback means to operate the motive means to restore the surface to a null position and thereby facilitate the manual control of the craft.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

Thus, from the foregoing description, it will be obvious that many parts of an automatic pilot system are included in my yaw preventing mechanism so that my device might be used for complete automatic steering with a slight modification or vice versa, so that, as sold, the device might be adapted for alternative use in either manner. Taking, for instance, the prior patent of Frische, Halpert and Wilkerson, 2,415,430, dated February 11, 1947 for Automatic Pilot as illustrative of a conventional automatic pilot, it will be evident that for normal automatic steering purposes, applicant's motor 24 would constitute the change course variable speed device 8 of said patent and the loop containing amplifier 28 opened; also that a course error or displacement term from the gyro would be fed to the rudder servo loop as well as a rate term, as shown in Fig. 2 of said patent. In other words, an automatic pilot of the general type shown in said Frische patent could also be adapted for performing the functions of yaw preventing when steering manually by relatively few although important additions to the system.

What is claimed is:

1. A system for damping a manually controlled dirigible craft about an axis thereof, including a device for detecting departure of the craft from a reference position about said axis, a differential having a pair of inputs and an output, means connecting one of said differential inputs and said reference device, a follow-up motor inherently subject to some time delay responsive to the output of said differential connected to its other input, means for providing a measure of the rate of change of the output of said differential, and motive means responsive to said measuring means operable to control the craft about said axis.

2. A system for damping a manually controlled aircraft about its yaw axis, including a directional gyro, an electrical differential having a pair of interconnected synchros with stator and rotor parts, means connecting one of the rotor parts of the differential and the directional gyro, a follow-up motor inherently subject to some time delay responsive to the output of the differential connected to the other rotor part, means providing a measure of the rate of change of the output of said differential, and motive means responsive to said measuring means operable to control the craft about its yaw axis.

3. In a dirigible craft having means for moving the craft about an axis, and manually operable means connected to said moving means, means for damping the movements of the craft about the axis including a device for detecting departure of the craft from a reference position about the axis, a differential having a pair of inputs and an output, means connecting one of said differential inputs and said reference device, a follow-up motor inherently subject to some time delay responsive to the output of the differential connected to its other input for restoring the output of the differential to zero, means providing a measure of the rate of change of the output of said differential, and a motive means responsive to said measuring means operatively connected to said craft moving means.

4. In an aircraft with a rudder, and manually operable means connected to the rudder; means for damping the craft about its yaw axis including a directional gyro, an electrical differential having a pair of synchros with interconnected stator and rotor parts, means connecting one of the rotor parts of the differential and the directional gyro, a follow-up motor inherently subject to some time delay responsive to the output of the differential connected to the other rotor part effective to zero the output of the differential under steady yaw conditions, means providing a measure of the rate of change of the output of said differential, and motive means responsive to said measuring means operatively connected to said rudder.

5. In a dirigible craft with a movable surface for controlling its movements about an axis, manually operable means connected to the surface, means providing a measure of the displacement of the surface from a null position, means for damping the movements of the craft about the axis including a device for detecting departure of the craft from a reference position about the axis, a differential having a pair of inputs and an output, means connecting one of said differential inputs to said reference device, a follow-up motor inherently subject to some time delay responsive to the output of the differential connected to its other input for restoring the output of the differential to zero, means providing a measure of the rate of change of the output of the differential, motive means operatively connected to the surface the input to which is responsive to the displacement measuring means and the rate measuring means, means for providing a signal proportional to the time integral of the input of the motive means, and means for feeding the signal of the signal means to the motive means in opposition to the input from the displacement measuring means.

6. In an aircraft with a rudder, manually operable means connected to the rudder, means providing a measure of the displacement of the rudder from a null position, means for damping the craft about its yaw axis including a directional gyro, an electrical differential having a pair of interconnected synchros with stator and rotor parts, means connecting one of the rotor parts of the differential and the directional gyro, a follow-up motor inherently subject to some time delay responsive to the output of the differential connected to the other rotor part effective to zero the output of the differential under steady yaw conditions, means providing a measure of the rate of change of the output of the differential, motive means operatively connected to the rudder the input to which is responsive to the displacement measuring means and the rate measuring means, means for providing a signal proportional to the time integral of the input of the motive means, and means for feeding the signal of said signal means to the motive means in opposition to the input from the displacement measuring means.

7. In a dirigible craft with a movable surface for controlling its movement about an axis, manually operable means connected to the surface, means providing a measure of the displacement of the surface from a null position, means for measuring the rate of change of movement of the craft about its yaw axis, motive means operatively connected to the surface responsive to the displacement measuring means and rate measuring means, means for providing a signal proportional to the time integral of the input of the motive means, and means for feeding the signal of the signal means to the motive means in opposition to the input from the displacement measuring means.

8. In an aircraft with a rudder, manually operable means connected to said rudder, means providing a measure of the displacement of the surface from a null position, means for measuring the yaw rate of the craft, motive means operatively connected to the rudder responsive to the displacement measuring means and rate measuring means, means for providing a signal proportional to the time integral of the input of the motive means, and means for feeding the signal of the signal means to the motive means in opposition to the input from the displacement measuring means.

9. In a system for damping a dirigible craft with a surface for controlling its movements about an axis, manually operable means connected to the surface, means providing a measure of the dipslacement of the surface from a null position, motive means operatively connected to the surface responsive to the displacement measuring means, means providing a signal proportional to the time integral of the input of the motive means, and means for feeding the signal of the signal means to the motive means in opposition to the input from the displacement measuring means.

10. In a system for damping an aircraft with yaw controlling rudder, manually operable means connected to the rudder, means providing a measure of the displacement of the rudder from a null position, motive means operatively connected to the rudder responsive to the displacement measuring means, means providing a signal proportional to the time integral of the input of the motive means, and means for feeding the signal of the signal means to the motive means in opposition to the input from the displacement measuring means.

11. In a damping system for dirigible craft having a control surface, motive means connected to the control surface, manually operable means connected to the control surface, signal means providing an input to the motive means in accordance with the displacement of the surface from a null position to normally operate the motive means to restore the surface to its null position, means for providing a signal upon persistent unidirectional operation of said manually operable means, and means for feeding the signal of said last named signal means to the motive meaans to override the normal operation of the displacement signal means in the system.

PETER J. CHENERY.

REFERENCES CITED

The following references are of record in the file of this patent:

UNITED STATES PATENTS

| Number | Name | Date |
|---|---|---|
| 2,423,336 | Moseley | July 1, 1947 |
| 2,429,642 | Newton | Oct. 28, 1947 |